July 5, 1938.  J. TJAARDA  2,122,444
AUTOMOBILE BODY
Original Filed July 20, 1934   4 Sheets-Sheet 3
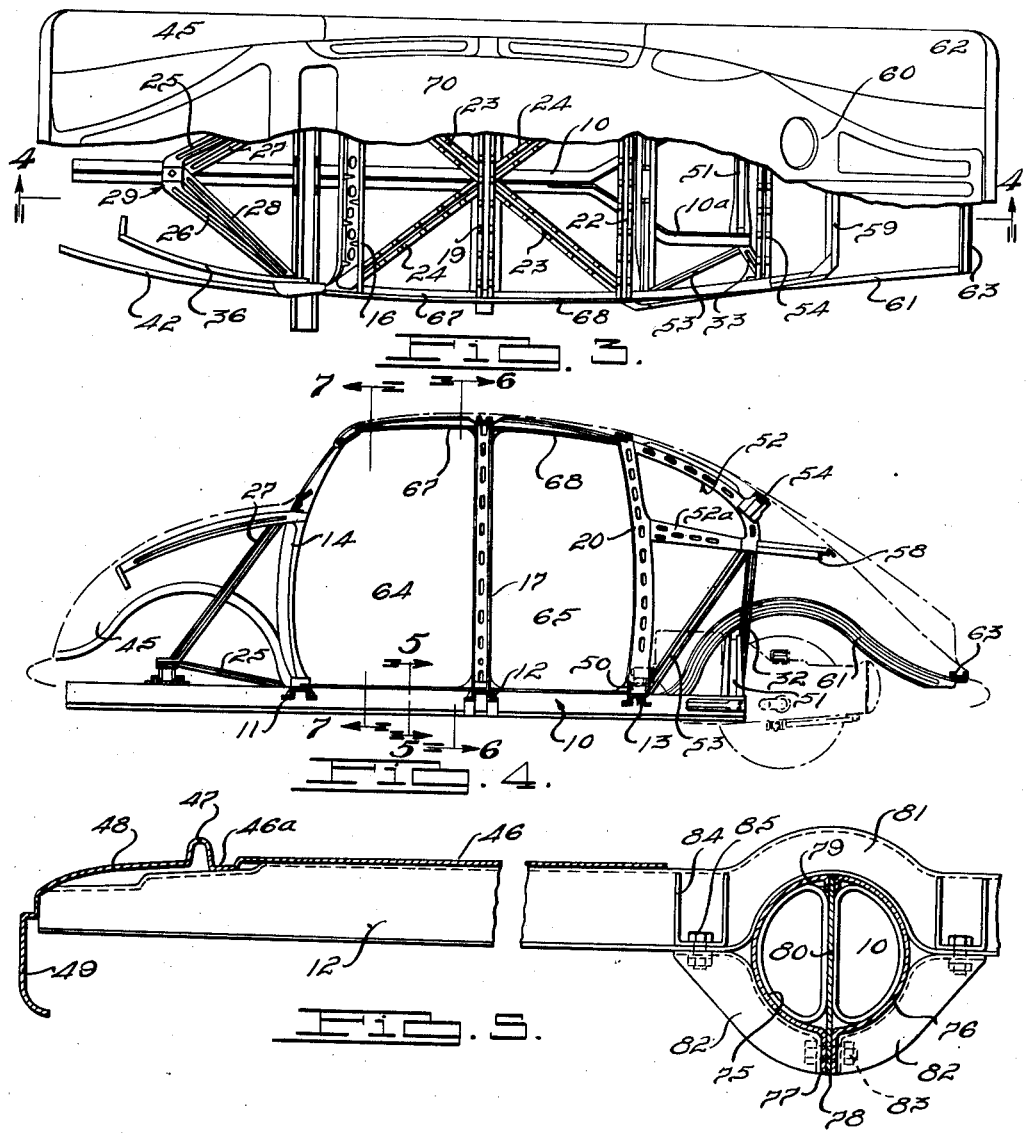
INVENTOR.
John Tjaarda.
BY
Dike, Calver & Gray
ATTORNEYS.

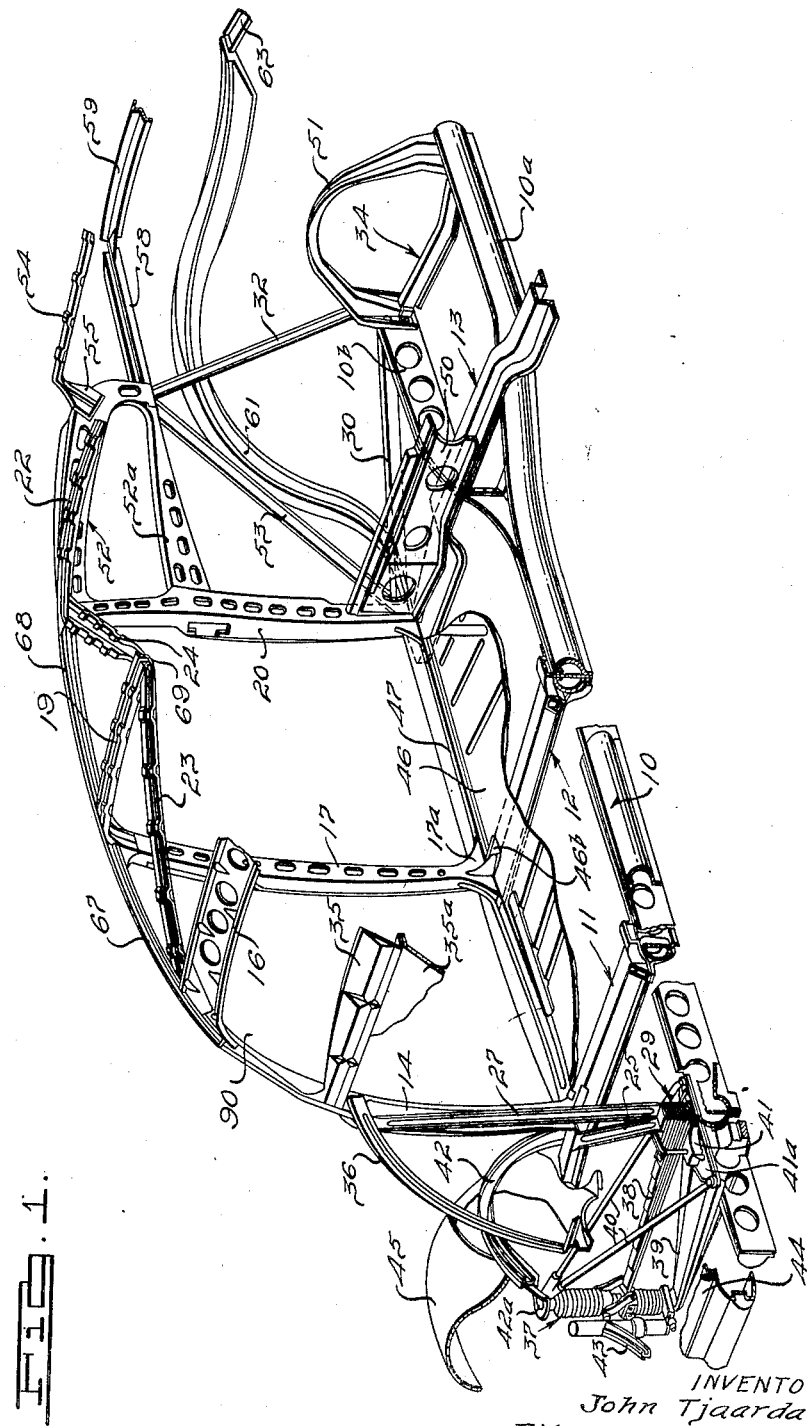

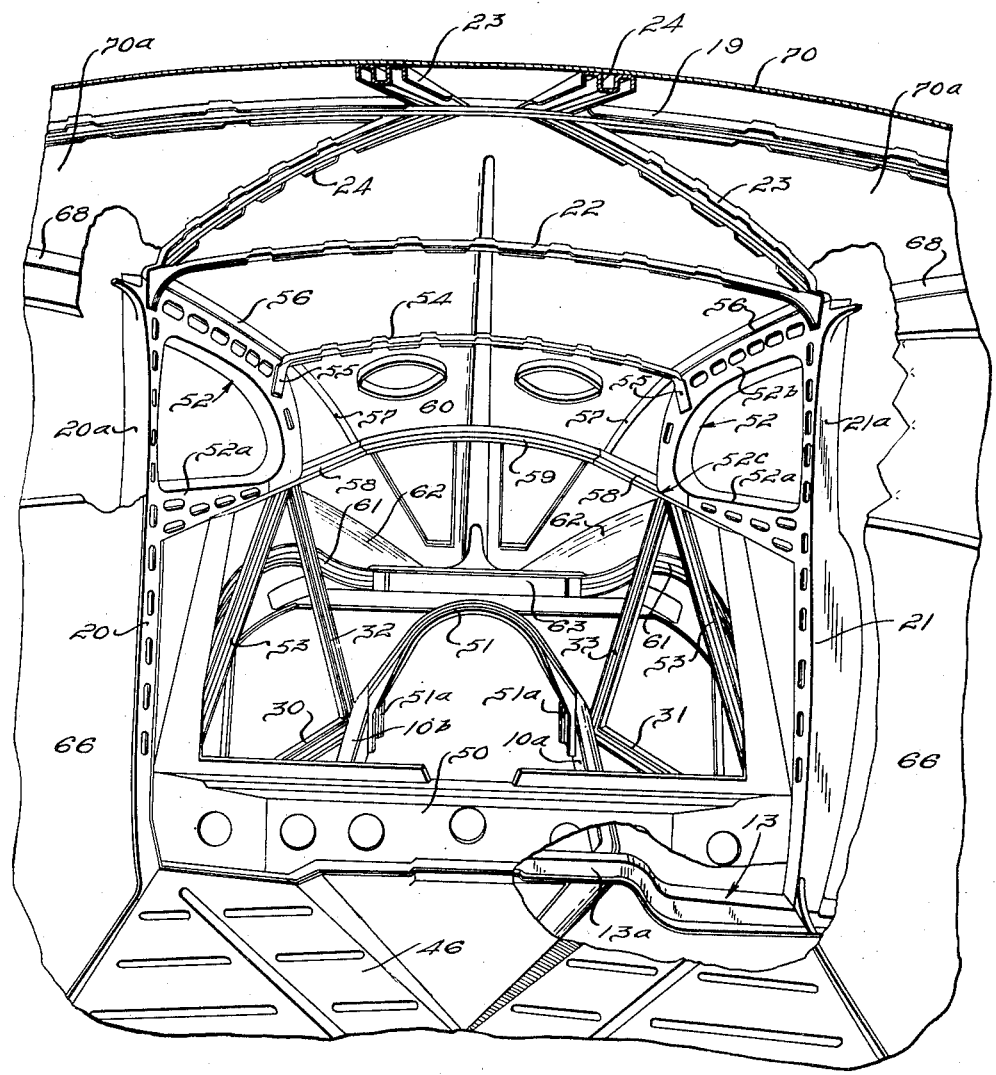

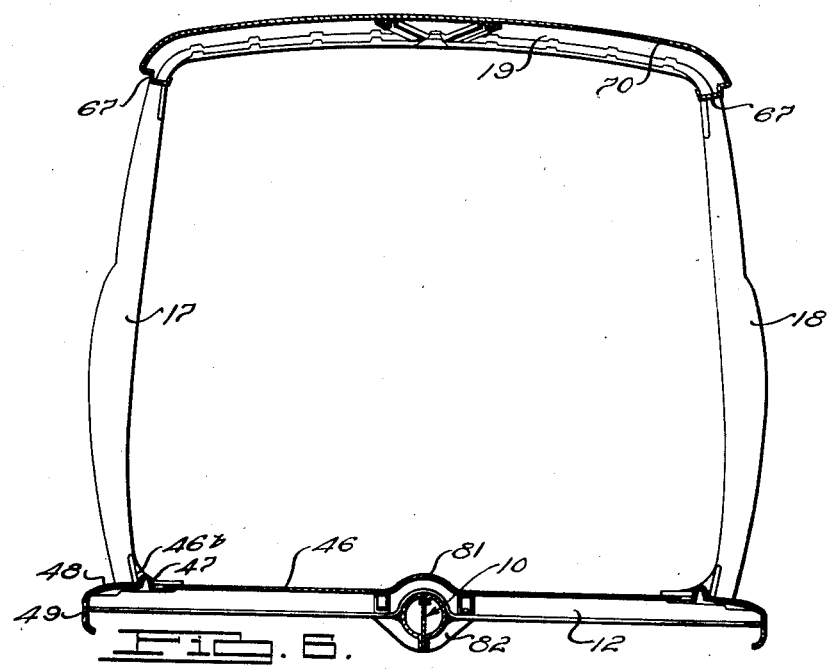
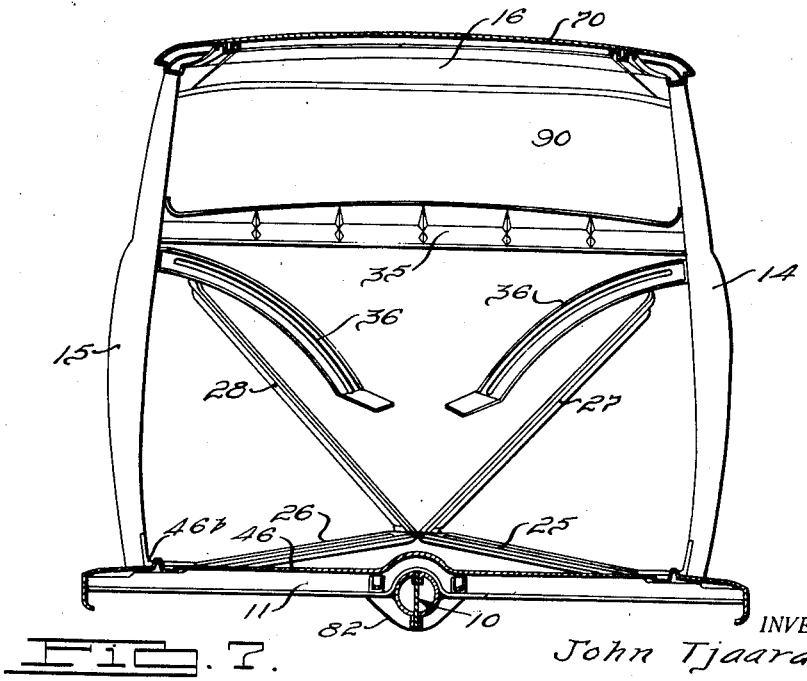

Patented July 5, 1938

2,122,444

UNITED STATES PATENT OFFICE 2,122,444

AUTOMOBILE BODY

John Tjaarda, Birmingham, Mich., assignor to Briggs Manufacturing Company, Detroit, Mich., a corporation of Michigan Application July 20, 1934, Serial No. 736,139
Renewed December 30, 1936

17 Claims. (Cl. 296—28)

This invention relates to automotive vehicles and more particularly to improvements in the frame and body structure of automobiles whereby substantial elimination in weight and better distribution of loads may be secured without sacrificing strength and durability while at the same time permitting the application of full streamlining principles to the design of the body.

A further object of the invention is to provide a unitary body and main frame or chassis structure so designed and constructed as to cause all load stresses to be transmitted and distributed throughout the entire unit whereby the upper body structure forms with the base or chassis frame members a unitary load carrying carcass, thus permitting the base frame and upper body structure to be greatly reduced in weight while preserving maximum strength.

A further object of the present invention is to provide an improved automobile body in which the entire side walls and roof of the structure forms with the chassis frame a unitary part of the stress and load carrying frame of the vehicle.

Another object of the invention is to provide improved load carrying framing for an automobile wherein the base is in the form of a central longitudinal truss or torque member forked at its rear end to provide a rear engine mounting and constructed at its rear end for support on the rear vehicle wheels through the medium of the engine, and wherein torsional stresses and forces are transmitted from said truss and in part absorbed by reinforced bottom, side and top body walls forming with said truss a unitary load carrying frame.

A further object of the invention is to provide a unitary body and frame carcass of relatively great lightness and strength and embodying skeleton framing including a central longitudinal bottom truss member having transverse rib members rigidly mounted thereon in balanced relation and in which said rib members form base portions or lower sides of continuous framing extending around four sides of the tonneau and thus embracing the passenger compartment and functioning with said truss as load carrying units.

A further object of the invention is to provide an automobile constructed in improved manner for mounting the engine at the rear end thereof and having fully streamlined characteristics, and wherein maximum strength and lightness are secured by providing an improved unitary body and frame carcass designed to distribute load stresses and forces uninterruptedly through the enclosing frame of the vehicle body, and wherein the frame structure is so designed and arranged as to provide forward and rear bulkheads effective to consolidate stresses transmitted through the framing.

Other objects of this invention will appear in the following description and appended claims, reference being had to the accompanying drawings forming a part of this specification wherein like reference characters designate corresponding parts in the several views.

Fig. 1 is a fragmentary central longitudinal sectional view, shown in perspective, and illustrating a unitary body and frame structure embodying the invention.

Fig. 2 is a fragmentary perspective view taken from the inside of the body looking towards the rear end thereof.

Fig. 3 is a top plan view of the body, portions of the roof being broken away to illustrate certain parts of the underlying structure.

Fig. 4 is a longitudinal sectional elevation taken substantially through lines 4—4 of Fig. 3 in the direction of the arrows.

Fig. 5 is an enlarged detail fragmentary section taken substantially through lines 5—5 of Fig. 4 in the direction of the arrows.

Fig. 6 is a vertical section taken substantially through lines 6—6 of Fig. 4 in the direction of the arrows.

Fig. 7 is a vertical section taken substantially through lines 7—7 of Fig. 4 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the present preferred form of the invention, herein illustrated by way of example, the frame structure is designed for a fully streamlined automobile having the engine thereof mounted in the rear end adjacent the rear driving wheels. The invention is shown as applied to a four door sedan but it will be understood that it may be adapted with suitable changes in design to other types of automotive vehicles. The present vehicle body is distinguished in at least one important respect from conventional types of automotive vehicles by the elimination of the customary chassis and body units in which the chassis is designed to receive and carry all load stresses and the body merely forms an enclosure or housing for the passenger compartment. In the present instance the load carrying frame of the vehicle includes as a unitary structure not only the base frame but also the framing extending therefrom and which embraces the passenger compartment of the vehicle, and the stresses are transmitted uninterruptedly through the framing and consolidated at front and rear bulkheads.

Referring to the drawings it will be seen that there is provided a central longitudinal truss member 10 which is in the form of a torque tube of wishbone type forming the back bone of the unitary frame structure, this truss member being bifurcated at its rear end to provide rear forked extensions 10a and 10b forming the rear engine mounting. Rigidly mounted on the longitudinal truss member 10 and suitably spaced longitudinally of the vehicle are a series of transverse struts or ribs 11, 12, and 13, these being in the form of structural members of channel formation which are fixed centrally thereof to the truss 10. Extending upwardly from opposite ends of the transverse bar 11 and rigidly fixed thereto as by welding are front sloping pillars 14 and 15, the upper ends thereof being joined by a transverse header 16 either integral therewith or secured thereto as by welding or riveting, see Figs. 1 and 7. Extending upwardly from the transverse base member or rib 12 at opposite ends thereof are center pillars 17 and 18 which are rigidly secured to the ends of the member 12 as by welding, and the upper ends of these pillars or uprights 17 and 18 are joined by a transverse cross member 19 welded or otherwise secured to the upper ends thereof, see Figs. 1 and 6. Extending upwardly from the transverse base member or rib 13 are rear pillars 20 and 21 which are fixed to the opposite ends of the bar 13, as by welding. The upper ends of the pillars 20 and 21 are rigidly joined together by a transverse bar 22 which may be fixed to the upper ends of the pillars by welding. The pillars are preferably stamped or pressed from sheet steel blanks into channel or other structural form.

The roof of the vehicle thus includes the transverse structural frame members 16, 19, and 22 preferably of channel formation which rigidly unite the upright pillars of the body, and these top cross-members are braced by means of diagonal struts 23 and 24. The struts 23 extend from the junctures of the frame members 14, 16, and 21, 22; and the diagonal struts 24 extend from the junctures of the frame members 15, 16, and 20, 22. These diagonal struts are preferably united at their points of intersection with each other and with the frame member 19 at a point 69 centrally of the vehicle roof. It will also be seen that the upper ends of the pillars 14 and 17 and the pillars 15 and 18 are joined together by longitudinal rails or header members 67, these headers being rigidly united to the upper ends of the pillars as well as the top frame members 16 and 19 as by welding. In like manner the upper ends of the pillars 17 and 20 and the pillars 18 and 21 are rigidly joined together by longitudinal rails or header members 68. The upper roof rails 67 and 68 are preferably continuous integral members at each side of the body. The front pillars 14 and 15 are also joined together transversely thereof by means of a belt bar or structural cross piece 35 which forms the lower edge of the windshield opening 90. Extending from the juncture of the base member 11 and the pillar 14 is an angularly extending strut 25. A strut 27 also extends from the juncture of the bar 35 and pillar 14 in converging relation to the strut 25. In like manner angularly extending converging struts 26 and 28 extend from the pillar 15 at the opposite side of the structure. The struts 25, 26, 27, and 28 extend forwardly in converging relation and are united to the forward end of the truss 10 at substantially a common point indicated at 29. These struts are rigidly united as by welding to the pillars 14 and 15 and cross-member 11 and are also rigidly united together and to the truss 10 forwardly of the frame member 11 and thus provide a forward bulkhead for the consolidation of forces and stresses at a focal point 29.

The series of transversely arranged structural steel members 14, 15, 16; 17, 18, 19; and 20, 21, 22, provide, in effect, a plurality of transverse unitary frames which are spaced longitudinally of the body from front to rear and are secured at their base or bottom portions to transverse struts or ribs 11, 12, and 13, respectively.

Extending rearwardly and inwardly from the juncture of the pillar 20 and cross-strut 13 is a channel shaped strut 30, and a similar strut 31 extends rearwardly and inwardly from the juncture of the members 13 and 21. The struts 30 and 31 converge toward the rear and the rear ends thereof are rigidly united as by welding or riveting, to the rear end of the forked arms 10a and 10b of the truss member 10. The upper ends of the pillars 20 and 21 are also rigidly joined to the rear ends of the truss members 10a and 10b through the rear roof rails 52b by means of struts 32 and 33 which also incline inwardly in converging relation. It will thus be seen that the frame members 10a, 10b, 30, 31, 32, and 33 are all united at the rear end of the vehicle at substantially a common location, indicated in general at 34, providing a bulkhead for the consolidation of forces and stresses.

A forwardly sloping dash 35a is secured to the belt bar 35. The forwardly sloping streamlined hood is in part supported by means of the inwardly extending curved brace members 36 which are secured at their rear ends to the front pillars 14 and 15, the forward flanged ends of the braces 36 being joined by a cross bar (not shown). As disclosed in my prior application Serial No. 700,444 the front wheels of the vehicle are carried by a mounting unit, indicated in general at 37, secured to the ends of a transverse leaf spring unit 38, these wheels being independently sprung in the manner shown and described in said application. The mounting unit 37 for each independently sprung front wheel includes a vertical spindle or king pin which is supported at the outer end of a transverse truss member 39.

The member 39 at its center has a socket to receive and seat the tubular beam 10 and together with an upper socketed clamping block 41 forms a yoke embracing the tube 10, the parts being rigidly united by bolts. Diverging tie rods 40 connect the upper end of each steering spindle or king pin to the flanges 41a of the clamping block 41, as shown and described in my aforesaid application. The leaf spring assembly 38 is clamped to the block 41 by U-bolts. Arched struts 42 are fixed at their rear ends to the outer ends of the truss bar 11. These struts extend over the upper ends of the king pins and the latter are connected thereto at 42a. The forward ends 43 of these struts are transversely united by a tie bar 44. The arched struts 42 provide supporting and reenforcing means for the fenders 45 and also brace the upper ends of the king pins or steering spindles.

Surmounting the cross bars 11, 12, and 13 is a stamped metal sheet 46 forming the floor pan. This sheet is welded to the cross bars and, as shown in Fig. 5, is formed adjacent the threshold at each side of the body with a longitudinal reenforcing groove 46a and an upstanding channel-shaped rib 47 forming abutments or jamb rails for the lower edges of the doors. The pan 46 is extended beyond the door jambs to provide longitudinal ledges 48 serving as running boards, and thence is downwardly flanged to provide depending side aprons 49. The lower ends of the pillars 14, 15, 17, 18, 20, and 21 are splayed at their points of union and are joined by welding with the pan 46 and cross members 11, 12, and 13, as shown at 17a in Fig. 1, and the joints are reenforced by welded gusset plates 46b.

The rear end of the passenger compartment or tonneau terminates, in the present instance, at the locality of the cross member 13 and is separated from the rear engine compartment by an upstanding stamped metal panel 50 welded at its lower flanged edge to the channel bar 13 and also welded at its ends to the rear pillars. This panel may be provided with openings, as shown in Fig. 1, for ventilation purposes.

The rear forked or splayed ends 10a and 10b of the central torque tube are designed to straddle the cylinder block of the engine and these ends are joined at the rear bulkhead by means of an arch 51 which extends over the engine block and is bolted thereto. The details of this construction are shown and described in my application Serial No. 719,656. Thus the rear end of the torque tube or beam 10 and connected frame parts at the rear bulkhead are supported on the engine block which in turn, as shown in said last-named application, is hung from the center of a transverse leaf spring unit to the ends of which the rear driving wheels are connected, as indicated in dotted lines in Fig. 4.

Extended rearwardly from the rear pillars 20 and 21 are frames, generally designated at 52, which support the rear quarter panels and which define the rear quarter window openings. The lower sides 52a of these frames are joined by welding at 52c to the upper converging ends of the struts 32, 33, and 53. The upper sides 52b form continuations of roof rails and are braced by a transverse tie bar 54 having bent ends 55 welded thereto. Reenforcing rib or strut members 56, 57, and 58, secured to the framing 52, extend rearwardly therefrom, as shown in Fig. 2, and a rear cross strut 59 joins these ribs at their points of juncture. The rear sloping deck of the roof, comprising a continuous stamped or pressed metal sheet, is mounted on the cross members 22, 54, and 59 and is welded thereto. The rear side or quarter panels, comprising stamped metal sheets, are integrally joined to the roof panel 60 and are reenforced by the bracing members 52, 53, 56, 57, and 58 welded thereto. These rear side panels are also secured, as by welding, to arched struts 61 extending rearwardly from the junctures of the pillars 20, 21 and the cross member 13. These struts support and reenforce the rear fenders 62, being integrally connected thereto, and the rear ends thereof are joined by a transverse channel bar 63.

In the present four-door type body the upright side pillars together with the roof rails or headers 67 and 68 define door openings 64 and 65 which are closed by means of stamped metal doors 66. The construction and mounting of the doors is shown and described in my application Serial No. 699,895.

The roof or top of the tonneau proper comprises a pressed metal sheet 70 which may either be an integral continuation of the rear deck panel 60 or a separate panel butt welded to the rear edge of the panel 60 to provide a smooth finished joint. The roof panels 60 and 70 are suitably arched to produce full streamlining effect and the sides 70a of the roof panel 70 are sloped uniformly to the side rails or headers 67 and 68 and are welded thereto. The roof panel is also welded to the cross members 16, 19, and 22 and to the diagonal braces 23 and 24. Thus, the side and roof panels of the body form continuous walls which are substantially an integral part of the bottom, side and top framing of the body. Hence, it will be seen that load stresses will be transmitted from the base frame members 10—13 directly through the side and top walls as well as through the upright pillars and upper connecting members. Transmitted forces will, furthermore, be consolidated at front and rear focal points constituting the bulkheads 29 and 34.

In its preferred form the central truss member or torque tube 10 comprises semi-circular pressed steel sections 75 and 76 having depending flanges 77 and 78 respectively, see Fig. 6. The upper longitudinal edges of the sections have inturned flanges 79. Interposed between the opposed flanges of the sections is a longitudinal plate 80 welded to the upper flanges 79. Each of the cross members 11, 12, and 13 has a central arched portion 81 embracing the upper half of the tube. Curved brackets 82 embrace the lower half of the tube and have their flanged ends secured to the flanged portions 77 and 78 and plate 80 by common through bolts 83. The opposite flanged ends of the brackets are bolted at 85 to the lower flanges of the channel members and to welded reenforcing U-pieces 84.

From the foregoing it will be seen that an automobile carcass constructed in accordance with the present invention will possess maximum strength and durability and full streamline characteristics while permitting a reduction in weight, without sacrificing strength, of at least twenty five to thirty per cent of the weight of conventional types of frame and body structures.

I claim:

1. In an automotive vehicle, a body and chassis unit comprising a central longitudinal truss member and a plurality of unitary frames each secured at the base thereof to said truss member and surrounding the tonneau, and a plurality of strut members extending rearwardly from the upper and lower portions of the rearmost of said frames and joined to the rear end of said truss member to provide a bulkhead in rear of the tonneau.

2. In an automotive vehicle, a body and chassis unit comprising a central longitudinal truss member and a plurality of unitary frames each secured at the base thereof to said truss member and surrounding the tonneau, a plurality of strut members extending rearwardly from the upper and lower portions of said frames and joined to the rear end of said truss member to provide a bulkhead in rear of the tonneau, and a plurality of strut members extending forwardly from the upper and lower portions of the foremost of said frames and joined to said truss member to provide a bulkhead in advance of said tonneau.

3. In an automotive vehicle, a central longitudinal truss member and continuous framing members extending around four sides of the vehicle passenger compartment and rigidly mounted on said truss member, and brace members extending from the upper and lower portions of said framing rearwardly in converging relation and joined to the rear end of said truss member to provide a bulkhead.

4. In an automotive vehicle, a central longitudinal truss member and continuous framing members extending around four sides of the vehicle passenger compartment and rigidly mounted on said truss member, and converging brace members extending forwardly and rearwardly from said framing and joined to the forward and rear ends of the truss member to provide front and rear bulkheads.

5. In an automotive vehicle, a central longitudinal truss member having mounting means at its rear end for an engine, continuous framing members extending around four sides of the tonneau and rigidly mounted on said truss member, and brace members extending rearwardly from said framing members and united to said truss member at the locality of said engine mounting to form a bulkhead.

6. In an automotive vehicle, a central longitudinal truss member bifurcated at its rear end to embrace an engine, an arched member connecting the bifurcated ends of the truss member for mounting the same on an engine block, continuous framing members extending around four sides of the tonneau and rigidly secured to said truss member, and brace members extending rearwardly in converging relation from the rearmost of said framing members and secured to said truss member at the locality of said arched member to provide a bulkhead.

7. In an automotive vehicle frame, a central longitudinal truss member terminating in a forked end having spaced branches forming an engine mounting, a plurality of longitudinally spaced transverse frames fixed to said truss member and extending continuously around the passenger compartment, and brace members extending from the upper and lower portions of each side of the rearmost of said frames longitudinally in converging relation and joined to said branches.

8. In an automotive vehicle frame, a central longitudinal truss member terminating in a forked end having spaced branches forming an engine mounting, a plurality of longitudinally spaced transverse frames fixed to said truss member and extending continuously around the passenger compartment, brace members extending from the upper and lower portions of each side of the rearmost transverse frame longitudinally in converging relation and joined to said branches, and an arched member joining said branches transversely for supporting the frame on an engine.

9. In an automotive vehicle frame, a central longitudinal truss member terminating in a forked end having spaced branches forming an engine mounting, a plurality of longitudinally spaced transverse frames fixed to said truss member and extending continuously around the passenger compartment, diagonal intersecting braces joining the upper sides of said frames, and a stamped metal roof panel rigidly secured to said upper sides and to said braces.

10. In an automotive vehicle, a longitudinal base frame, a plurality of longitudinally spaced transverse frames fixed to said base frame and extending continuously around all four sides of the tonneau compartment, longitudinal top rails rigidly joining the upper sides of said frames, a pair of rearwardly extending arched fender carrying truss members extending from the base of the rearmost frame, a transverse structural bar joining the ends of said truss members, and stamped sheet metal roof and rear quarter panelling forming a continuous streamlined rear deck integrally joining said truss members and bar.

11. In an automotive vehicle, a longitudinal base frame, a plurality of longitudinally spaced transverse frames fixed to said base frame and extending continuously around all four sides of the tonneau compartment, longitudinal top rails rigidly joining the upper sides of said frames, a pair of rearwardly extending arched fender carrying truss members extending from the base of the rear transverse frame, a transverse structural bar joining the ends of said truss members, and stamped sheet metal roof and rear quarter panelling forming a continuous streamlined roof and rearwardly sloping rear deck integrally joining said frames, truss members and bar.

12. In an automotive vehicle, a central longitudinal truss member, a plurality of longitudinally spaced transverse frames rigidly secured to said truss member and extending continuously around all four sides of the tonneau compartment, the upright sides of said frames forming pillars, longitudinal channel members joining the lower ends of said pillars at each side of the frames, said members being integrally formed in a pressed metal sheet providing the floor pan of the body.

13. In an automotive vehicle, a central longitudinal truss member, a plurality of longitudinally spaced transverse frames rigidly secured to said truss member and extending continuously around all four sides of the tonneau compartment, the upright sides of said frames forming pillars, longitudinal channel members joining the lower ends of said pillars at each side of the frames, said members being integrally formed in a pressed metal sheet providing the floor pan of the body, and a stamped metal roof panel welded to the upper sides of the frames and extending continuously between the frames.

14. In an automotive vehicle, a longitudinal base frame, a plurality of longitudinally spaced transverse metal frames rigidly secured to said base frame and extending continuously around all four sides of the tonneau compartment, diagonal metal brace members rigidly joining the upper sides of the frames, and a stamped metal roof panel welded to the upper sides of the frames and to said brace members and extending continuously between the frames, arched fender supporting members connected to said frames, a transverse tie bar joining the ends of said fender members, and said roof panel sloping in streamlined manner to said tie bar and secured thereto.

15. In an automotive vehicle, a longitudinal base frame, a plurality of longitudinally spaced transverse metal frames rigidly secured to said base frame and extending continuously around all four sides of the tonneau compartment, rearwardly extending fenders secured to the rearward of said frames, a transverse bar joining the rear ends of the fenders, and a continuous streamlined pressed metal roof panel supported at its rear edge by said bar and integrally secured to the upper sides of said frames.

16. In an automobile, a central longitudinal truss member having a bifurcated rear end providing a rear engine mounting, longitudinally spaced transverse ribs joined to said truss member in balanced relation, upright rib members and transverse top rib members forming with said transverse ribs a continuous frame enclosing the passenger compartment and in direct load carrying relation to said truss member, and a stamped metal roof panel having top and side walls welded to said top rib members and to said upright rib members and forming therewith a stress receiving means.

17. In an automotive vehicle, a longitudinal base frame, a plurality of longitudinally spaced transverse frames fixed to said base frame and extending continuously around all four sides of the tonneau compartment, longitudinal top rails rigidly joining the upper sides of said frames, a pair of rearwardly extending arched fender carrying truss members extending from the base of the rear transverse frame, a transverse structural bar joining the ends of said truss members, and a stamped sheet metal roof forming a continuous streamlined rear deck integrally joining said truss members and bar.

JOHN TJAARDA.